United States Patent [19]

Murata

[11] Patent Number: 4,787,039
[45] Date of Patent: Nov. 22, 1988

[54] DISPLAY DEVICE FOR MOTOR VEHICLE AND INFORMATION DISPLAY METHOD IN THE DEVICE

[75] Inventor: Hajime Murata, Shimada, Japan

[73] Assignee: Yazaki Corporation, Japan

[21] Appl. No.: 869,050

[22] Filed: May 30, 1986

[30] Foreign Application Priority Data

May 31, 1985 [JP] Japan ............... 60-080814[U]

[51] Int. Cl.⁴ .................. B60Q 1/00; G06F 15/20
[52] U.S. Cl. .................. 364/424.01; 340/52 R; 340/52 F
[58] Field of Search ........... 364/424, 444, 565, 433; 340/52 R, 52 F, 716, 722, 753, 754, 756

[56] References Cited

U.S. PATENT DOCUMENTS

| | | | |
|---|---|---|---|
| 4,357,663 | 11/1982 | Robbins et al. | 364/433 |
| 4,611,193 | 9/1986 | Brüggemann | 340/52 F |
| 4,631,513 | 12/1986 | Teshima et al. | 340/52 F |
| 4,635,030 | 1/1987 | Rauch | 340/52 R |
| 4,635,034 | 1/1987 | Tokuyama et al. | 340/52 F |
| 4,638,448 | 1/1987 | Cuvelier et al. | 364/565 |
| 4,646,059 | 2/1987 | Iwamoto et al. | 340/52 R |
| 4,663,718 | 5/1987 | Augello et al. | 340/52 F |
| 4,688,029 | 8/1987 | Kawasaki et al. | 340/754 |
| 4,689,615 | 8/1987 | Del Rosso | 340/722 |

Primary Examiner—Gary Chin
Attorney, Agent, or Firm—Wigman & Cohen

[57] ABSTRACT

A display device and a method for displaying information in motor vehicles utilizes a single display for both bar graph information and emergency messages using alphanumeric characters and symbols. A dot matrix display device is arranged in close proximity to a scale indicator. A controller for the display includes means for judging whether emergency information such as disconnection of power or oil level or an incomplete closing of a door is to be displayed by symbol display or whether information such as engine speed is to be displayed by graph display. The controller then selects the appropriate display mode and displays the information in the proper format.

3 Claims, 3 Drawing Sheets

DISPLAY DEVICE FOR MOTOR VEHICLE AND INFORMATION DISPLAY METHOD IN THE DEVICE

BACKGROUND OF THE INVENTION

1. Field of the Invention

The present invention relates to a display device for a motor vehicle, and an information display method in the device, for displaying physical quantities or conditions that are needed by the motor vehicle such as the rotation number of engine, the balance of gasoline, disconnection of power, and the position of hand brake.

2. Description of the Prior Art

As an existing display device there is known one with structure as shown in FIG. 1.

The bar display device 1 for displaying such quantity as rotation number of the engine, comprises a bar display section 2 consisting of fluorescent display tubes and a scale section 3 that is provided in the area above the display section 2. Further, beneath the bar display device 1, there is provided a dot matrix display device 4 for displaying warning information such as disconnection of wire and oil level, or running information by means of numerals, Roman alphabets, kana characters, symbols, or others.

In such an existing structure, displays by bar graphs and by dot matrices are carried out by separate display devices. Therefore, it is not easy to provide a display device using the dot matrices, together with the engine rotation meter, gauges, and so forth, in a limited space for motor vehicle instruments. Further, even when the both kinds of display are provided, the dot matrix display device is used only for emergencies such as displaying of disconnection of power and oil level, without being needed under normal conditions, so that it is disadvantageous from the cost point of view. Moreover, when the dot matrix display device is not in use for displaying information, it is not desirable esthetically either.

SUMMARY OF THE INVENTION

An object of the present invention which is aimed at resolving the above problems, is to provide a display device for motor vehicles which is capable of realizing both graph display and symbol display by means of one display unit that is arranged in a limited space for instruments of motor vehicle.

Another object of the present invention is to provide a display device for motor vehicles which makes it possible to cut the cost due to the use of only one display unit.

Another object of the present invention is to provide a display device for motor vehicles which can be arranged in a limited space of instruments for motor vehicles.

Another object of the present invention is to provide an information display method in a display device for motor vehicles which is capable of realizing both graph display and symbol display by means of a dot matrix display unit.

Another object of the present invention is to provide an information display method in a display device for motor vehicles, which is capable of realizing both graph display and symbol display by means of a dot matrix display device, and in addition, in carrying out bar graph display, scaling bars are displayed at the scaling positions for respective bars, in order to present the bars to be more easy to recognize.

A further object of the present invention is to provide an information display method in a display device for motor vehicle which makes it possible, when emergency information is input, to display the emergency information by means of symbols or bars, by giving it priority over ordinary information.

One of the special features of the present invention to meet the above objects is that a display device for motor vehicle equipped with a dot matrix display unit includes (i) an information inputting unit for inputting information to be displayed, (ii) a control processing unit (CPU) for processing the information that is input to the information inputting unit, and (iii) a memory which stores a program that judges the information input to be displayed by symbols or by graphs, and, based on the result of the judgment, processes the information for symbol display or for graph display; Accordingly the information processed in CPU is displayed by symbols or by graphs in the dot matrix display unit.

Another feature of the present invention is that in an information display method in a display device for motor vehicle equipped with a dot matrix display unit, when information to be displayed is designated, the device (i) judges whether the information is to be displayed by symbols or by graphs, (ii) if the information is judged to be displayed by symbols, the information is processed for symbol display, and is output to the dot matrix display unit, and (iii) if the information is judged to be displayed by graphs, the formation is processed for graph display and is output to the dot matrix display unit; in this way, it is made possible to carry out both of symbol display and graph display of an information in the dot matrix display unit.

These and other objects, features and advantage of the present invention will be more apparent from the following description of a preferred embodiment taken in conjunction with the accompanying drawings.

DESCRIPTION OF A PREFERRED EMBODIMENT

Figure 1:
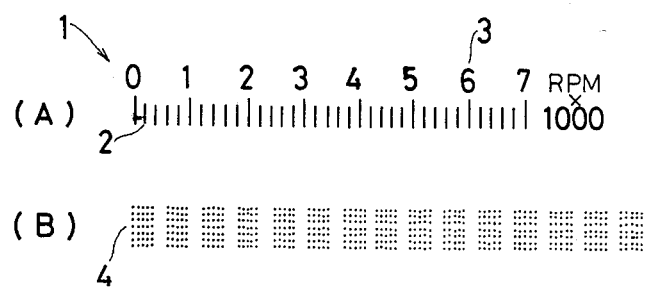
FIG. 1 is a diagram illustrating a prior display device for motor vehicles.
Figure 2:
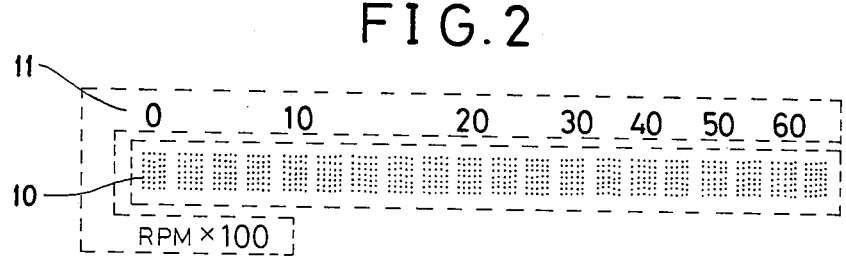
FIG. 2 is a diagram illustrating an embodiment of the display unit of the display device for motor vehicles in accordance with the present invention.

Referring to FIG. 2, there is shown a linear dot matrix display unit 10 for information display provided on the installment of a motor vehicle. In the neighborhood of the display unit 10 there is provided a scale unit 11 for showing the rotation number of the engine.

Figure 3:
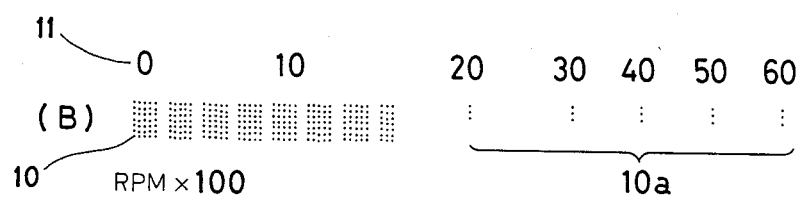
FIGS. 3(A) and 3(B) are diagrams for illustrating the respective displaying form of display unit shown in FIG. 2.

When the display unit 10 displays disconnection of power, incomplete closing of door, balance of gasoline, and other emergency information, the dot matrix display unit 10 is used, as shown in FIG. 3(A), for dot display of letters, symbols, numerals, or the like, with no display on the scale unit 11 by turning off the light that illuminates the unit 11.

On the other hand, in displaying the tachometer, one verticle line in the segments of the dot matrix display unit 10 is used as shown in FIG. 3(B) in one direction for displaying as bar graph, in response to the number of engine rotations. In addition, the scales for the tachometer are displayed by illuminating the scale unit 11.

Moreover, in order to show clearly the position of the typical number of rotations, one vertical line in each of the segments in 10a of the display unit 10 is lighted up in advance, as shown in FIG. 3(B).

Figure 4:
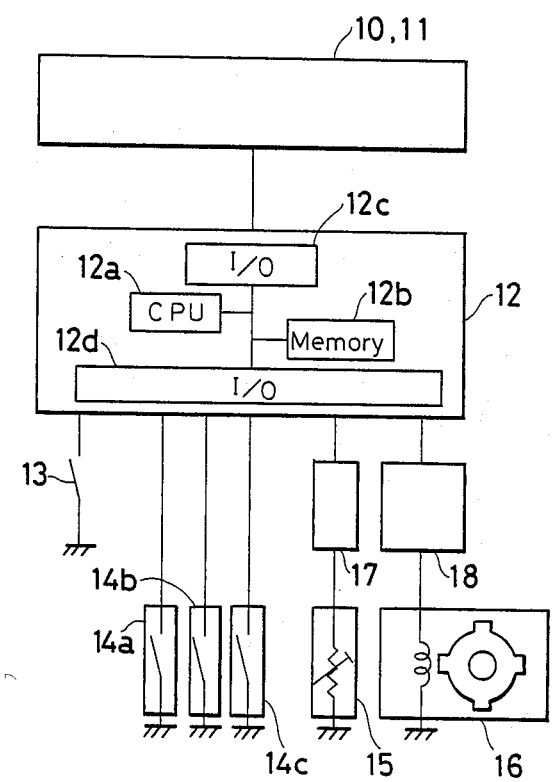
FIG. 4 is a diagram for showing the driving unit of the display device in accordance with the present invention.

FIG. 4 shows the driving unit for the display unit 10 and the scale unit 11. In the driving unit there is provided a control circuit 12 that includes of a CPU 12a, a memory 12b, and input-output (I/O) ports 12c and 12d. Further a manual selection switch 13, various kinds of warning switches 14a to 14c, a gauge sensor 15, and a tachometer sensor 16, are connected to the control circuit 12 as input data sources. Of these, the gauge sensor 15 and the tachometer sensor 16 are connected via respective interfaces 17 and 18 to the control circuit 12.

The manual selection switch 13 provides for manually switching between the tachometer display mode by bar graphs and the digital display mode of gauge by the dot matrices. The warning switches 14a to 14c include emergency information such as a disconnection switch, an oil level switch, a hand brake switch, and switch for incomplete closing of the door. Further, the output of the control circuit 12 carries out display control for the dot matrix display unit 10 and the scale unit 11.

Figure 5:
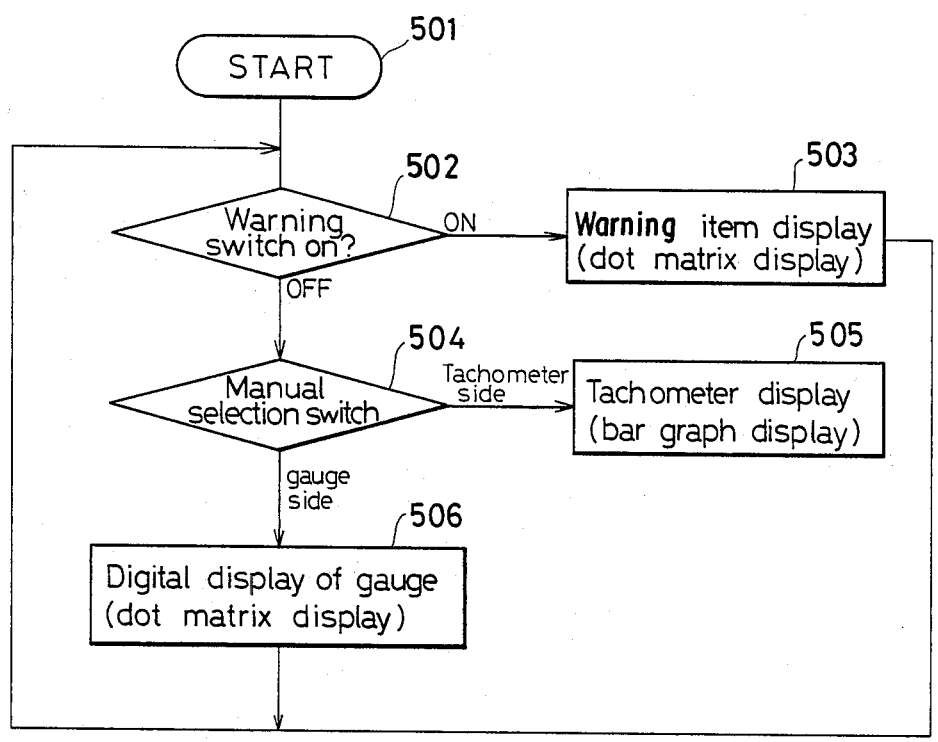
FIG. 5 is a diagram for illustrating the processing flow of the control circuit shown in FIG. 4.

FIG. 5 illustrates the processing flow for the control circuit 12 shown in FIG. 4. After start (step 501), it is inspected whether the warning switches 14a to 14c are in on-state or off-state (step 502). If some of them are in on-state, the corresponding items are displayed in the display unit 10 by means of the dot matrix display, as well as the illumination for the scale unit 11 is turned off (step 503). If the warning switches 14a to 14c are in off-state, the condition of the manual selection switch 13 is inspected (step 504), and if it is found in the condition of tachometer display mode, the tachometer reading is displayed by bar graphs in the display unit 10, based on the data from the tacho sensor 16 that is read via the interface 18, and the scale unit 11 is illuminated (step 505). On the other hand, if the manual selection switch 13 is in the condition of gauge display mode, the gauge reading is digitally displayed by dot matrices in the display 10, based on the data read from the gauge sensor 15 via the interface 17, and the illumination for the scale unit 11 is turned off (step 506).

In the above, the gauge display items include the balance of gasoline, oil pressure, water temperature, and so forth.

As in the foregoing, according to the present invention, both of the bar graph display and the dot matrix display can be accomplished by the use of a single display unit, so that the restrictions on the space can be relaxed and a reduction in cost can be realized. Further, when information which does not require to be displayed for all times is not in display, the same display unit will be displaying information which needs be displayed constantly. Therefore, harmony in the design of the device can be achieved.

Although the invention has been described in its preferred embodiment, it is to be understood that various changes and modifications may be made within the purview of the appended claims without departing from the true scope and spirit of the invention in its broader aspects.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An information display method in display device for motor vehicles with dot matrix display unit, comprising the steps of:
   (i) judging whether or not there is input emergency display information;
   (ii) interrupting the ordinary information display if there is input emergency display information;
   (iii) judging whether the emergency information is to be symbol displayed or graph displayed; and
   (iv) processing the emergency display information for symbol display or for graph display, based on the result of the judgement of whether the emergency information is to be symbol displayed or graph displayed, and outputting the result of the processing to the dot matrix display unit.

2. An information display method in display device for motor vehicles with dot matrix display unit, comprising the steps of:
   (i) judging whether or not there is input emergency display information;
   (ii) interrupting the ordinary information display if there is input emergency display information;
   (iii) processing the emergency display information for symbol display and outputting the result of the processing to the dot matrix display unit.

3. A display device for motor vehicles with dot matrix display unit, comprising:
   (i) means for judging whether or not there is input emergency display information;
   (ii) means for interrupting the ordinary information display if there is input emergency display information; and
   (iii) means for processing the emergency display information for symbol display and outputting the result of the processing to the dot matrix display unit.

* * * * *